United States Patent
Shimada et al.

(10) Patent No.: US 7,761,707 B2
(45) Date of Patent: Jul. 20, 2010

(54) RECORDING MEDIUM, CONTENT PLAYER, CONTENT PLAYER METHOD, AND COMPUTER PROGRAM

(75) Inventors: Muneki Shimada, Tokyo (JP); Shiho Moriai, Kanagawa (JP); Kazuhiro Kanee, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 611 days.

(21) Appl. No.: 11/579,819

(22) PCT Filed: Mar. 23, 2005

(86) PCT No.: PCT/JP2005/006001
§ 371 (c)(1),
(2), (4) Date: Sep. 13, 2007

(87) PCT Pub. No.: WO2005/109208
PCT Pub. Date: Nov. 17, 2005

(65) Prior Publication Data
US 2008/0016342 A1  Jan. 17, 2008

(30) Foreign Application Priority Data
May 10, 2004  (JP) .............................. 2004-140432

(51) Int. Cl.
H04L 29/06 (2006.01)
G06F 11/30 (2006.01)
G06F 7/04 (2006.01)
H04N 7/167 (2006.01)

(52) U.S. Cl. ................... 713/166; 713/193; 380/201; 726/26

(58) Field of Classification Search ............... 713/166, 713/189, 190, 193; 707/205; 365/200; 726/26–27; 380/201
See application file for complete search history.

(56) References Cited

U.S. PATENT DOCUMENTS 6,128,735 A * 10/2000 Goldstein et al. ........... 713/166

(Continued)

FOREIGN PATENT DOCUMENTS

JP  07-021688  1/1995

(Continued)

OTHER PUBLICATIONS

Article entitled "Revocation and Tracing Schemes for Stateless Receivers" by Naor et al., Jun. 2002, pp. 1-36.

*Primary Examiner*—Kieu Oanh Bui
*Assistant Examiner*—William Corum
(74) *Attorney, Agent, or Firm*—Matthew B. Dernier, Esq.; Gibson & Dernier LLP

(57) ABSTRACT

To provide a recording medium on which an entire piece of decryption information that is required to be highly secure is recorded while being kept secure even when it is larger in data size than the storage capacity of an area originally intended for recording it.

A recording medium in which encrypted content that has been encrypted and decryption information for the decryption of the encrypted content are recorded in two areas of different security levels. Decryption information B which is a portion of the decryption information is recorded in an area L of a relatively higher security level. The encrypted content and decryption information C which is the remainder of the decryption information that has been encrypted are recorded in an area D of a relatively lower security level. The decryption information B recorded in the area L includes information indicating the location where the decryption information C is recorded and information for the decryption of the remainder.

13 Claims, 4 Drawing Sheets

U.S. PATENT DOCUMENTS

| | | |
|---|---|---|
| 6,598,161 B1 * | 7/2003 | Kluttz et al. ................ 713/166 |
| 6,633,853 B2 * | 10/2003 | Oshima et al. ................ 705/57 |
| 2003/0033569 A1 * | 2/2003 | Klein et al. ................ 714/751 |
| 2003/0142560 A1 * | 7/2003 | Terao et al. ................ 365/200 |
| 2003/0167408 A1 * | 9/2003 | Fitzpatrick et al. .......... 713/201 |
| 2003/0191745 A1 * | 10/2003 | Jiang et al. .................... 707/2 |
| 2004/0133791 A1 * | 7/2004 | Sako et al. ................ 713/193 |
| 2004/0190868 A1 * | 9/2004 | Nakano et al. ................ 386/94 |
| 2004/0202077 A1 * | 10/2004 | Hwang et al. ............ 369/53.17 |
| 2004/0255117 A1 * | 12/2004 | Paatero et al. ............... 713/166 |

FOREIGN PATENT DOCUMENTS

| | | |
|---|---|---|
| JP | 2002-150675 | 5/2002 |
| JP | 2003-196920 | 7/2003 |
| JP | 2003-196922 | 7/2003 |
| WO | WO 97/14147 | 4/1997 |

* cited by examiner

| FLAG | START ADDRESS OF DECRYPTION INFORMATION C | DATA SIZE OF DECRYPTION INFORMATION C | DECRYPTION INFORMATION A0 |

DECRYPTION INFORMATION A1
FIG. 3A
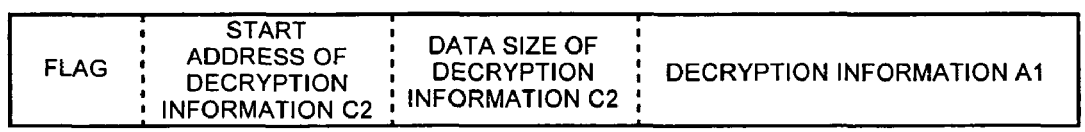
FIG. 3B
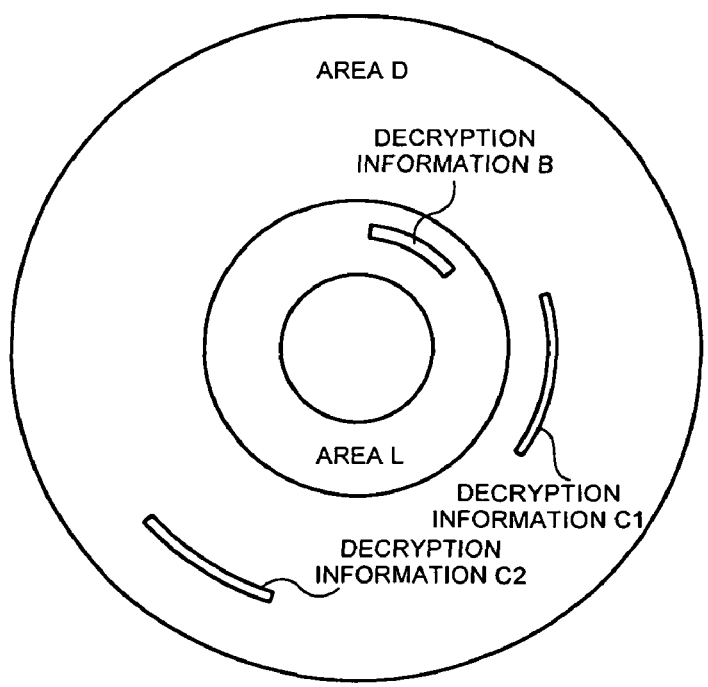
FIG. 4

RECORDING MEDIUM, CONTENT PLAYER, CONTENT PLAYER METHOD, AND COMPUTER PROGRAM

TECHNICAL FIELD

The present invention relates to a recording medium such as a CD (Compact Disc) and a DVD (Digital Versatile Disc) on which digital content such as music, video, and game programs has been recorded, a player for the recording medium, a player method, and a computer program.

BACKGROUND OF THE INVENTION

Digital content including music, video, and game programs is typically recorded on a recording medium such as a CD or a DVD for distribution purposes. For digital content, various approaches to copyright protection have been attempted. As an example of such approaches, a technique is known with which encrypted content, i.e., an encryption result of digital content, is recorded on a recording medium and which only the content player that is allowed to play the digital content is permitted to decrypt and play the encrypted content. Such a technique is disclosed in, for example, Dalit Naor, Moni Naor, and Jeff Lotspiech, "Revocation and Tracing Scheme for Stateless Receivers" (CRYPTO '01, Lecture Notes in Computer Science 2139, pp. 41-62, Springer-Verlag, 2001) ("Document 1").

On the recording medium, recorded in addition to encrypted content are information (hereinafter, referred to as "decryption information") for the decryption of the encrypted content, and information (hereinafter, referred to as "management information") such as TOC (Table Of Contents) that is used for managing the recording medium. The management information is typically recorded in an area that is different from the area where the encrypted content is recorded. For example, in the recording media such as DVDs, the management information is recorded in a more secure area, such as a lead-in (Lead-in) area, having a much smaller physical storage capacity as compared with an area where encrypted content is recorded.

The decryption information includes at least one of information about a player that is allowed to decrypt and play the encrypted content and information about an unauthorized player that is not allowed to do so. This prevents an unauthorized player from playing content. When an unauthorized player is newly added, the decryption information is updated to cope with the revocation of the unauthorized player. Though depending on the approach for the revocation, the data size of the decryption information that should be recorded on the recording medium becomes larger as the number of the players to be revoked is increased when a typical method such as the CS (Complete Subset) scheme and the SD (Subset Difference) scheme described in Document 1 is used.

As described above, the area in which the management information is to be recorded is physically small in storage capacity. Therefore, when having a large data size, the management information may not fall within a highly secure area that is originally intended for recording it. In particular, the data size of the decryption information may be increased, causing a problem of not being able to record, after the upgrading, the decryption information which can originally be recorded in an area of a higher security level on the recording medium. This limits, for example, the number of the players that should be revoked for their decryption and their play, and the number of the players that should be revoked cannot thus be increased more than a certain number.

The present invention is directed to provide a recording medium on which whole pieces of information such as the management information that is intended to be recorded in an area of a higher security level is recorded while keeping the management information secure, even when it is larger in data size than the storage capacity of the area originally intended for recording it, and a technique to play the recording medium.

SUMMARY OF THE INVENTION

A recording medium of the present invention that solves the aforementioned problem is a recording medium having two areas of different security levels in which encrypted content that has been encrypted through a predetermined technique and decryption information for the decryption of the encrypted content are recorded, which is characterized in that: a portion of said decryption information is recorded in a first area having a relatively high security level; the remainder of said decryption information that has been encrypted through said predetermined technique and said encrypted content are recorded in a second area having a relatively low security level; and said portion of said decryption information recorded in said first area includes information indicating the presence or absence of said remainder of said decryption information, information indicating the location at which said remainder is recorded, information indicating the data size of said remainder, and information for the decryption of said remainder.

The decryption information is recorded in two areas, a first area and a second area, in separate blocks. This means that the whole piece of decryption information can be recorded regardless of the data size of the decryption information. The remainder of the decryption information, which is recorded in the second area, has been encrypted, so that the decryption information can be kept highly secure. In addition, with the information indicating the presence or absence of the remainder of the decryption information, it becomes possible to play similarly to conventional recording media when there is no such remainder.

For example, even when said decryption information is larger in data size than the storage capacity of said first area, said portion of said decryption information is ensured to have a data size that is smaller than the storage capacity of said first area and the remainder is recorded in the second area. This allows the recording of the whole piece of decryption information.

With such recording media, said remainder of said decryption information may be divided into blocks and be separately recorded at multiple locations in said second area. In such a case, said portion of said decryption information includes information indicating either one of the multiple locations at which the blocks of said remainder are recorded. Each divided block of said remainder of said decryption information includes information indicating the location(s) at which other divided block(s) of the remainder except for one is/are recorded. All locations at which the divided blocks of said remainder of said decryption information are recorded can be identified by using said portion of said decryption information and the divided blocks of said remainder of said decryption information except for said one.

For example, with the increase of information about an unauthorized player or players that is/are not allowed to decrypt and play encrypted content, the information for that addition is recorded. Then, the remainder of the decryption information may be recorded in blocks at multiple locations on the second area. In such a case, a start address of the information to be added is included in the remainder of the decryption information that is used to be recorded in the second area. This allows the designation of the address of the added information.

In addition, when said remainder of said decryption information is divided into blocks and is separately recorded at multiple locations in said second area, said portion of said decryption information may include information indicating all locations at which the blocks of said remainder are recorded.

Said portion of said decryption information includes, for example, at least one of information about a player that is allowed to decrypt and play said encrypted content and information about a player that is not allowed to do so.

Another recording medium of the present invention is a recording medium having two areas of different security levels in which encrypted content that has been encrypted through a predetermined technique and management information including information for the decryption of the encrypted content are recorded, which is characterized in that: a portion of said management information is recorded in a first area having a relatively high security level; the remainder of said management information that has been encrypted through said predetermined technique and said encrypted content are recorded in a second area having a relatively low security level; and said portion of said management information recorded in said first area includes information indicating the presence or absence of said remainder of said management information, information indicating the location at which said remainder is recorded, information indicating the data size of said remainder, and information for the decryption of said remainder.

The management information is recorded in two areas, a first area and a second area, in separate blocks. This means that the whole piece of management information can be recorded regardless of the data size of the management information. The remainder of the management information, which is recorded in the second area, has been encrypted, so that the management information can be kept highly secure. In addition, with the information indicating the presence or absence of the remainder of the management information, it becomes possible to play similarly to conventional recording media when there is no such remainder.

For example, even when said management information is larger in data size than the storage capacity of said first area, said portion of said management information is ensured to have a data size that is smaller than the storage capacity of said first area and the remainder is recorded in the second area. This allows the recording of the whole piece of management information.

A content player of the present invention is a content player for playing content from a recording medium in which a portion of management information including information for the decryption of encrypted content that has been encrypted through a predetermined technique is recorded in a first area of a relatively high security level, and the remainder of said management information that has been encrypted through said predetermined technique and said encrypted content are recorded in a second area of a relatively low security level, said portion of said management information including information indicating the location at which said remainder of said management information is recorded and information for the decryption of said remainder, said content player comprising: readout means for reading, out of said recording medium, said portion of said management information, said remainder of said management information, and said encrypted content in this order; signal processing means adapted to decrypt said encrypted content according to said management information read by said readout means; and control means adapted to determine the location from which said readout means reads said management information or said encrypted content out of said recording medium and to direct said readout means to read out from said location; said signal processing means being configured to detect the location where said remainder of said management information is recorded from said portion of said management information and notify said control means of it, and to decrypt said remainder of said management information with said portion of said management information when said remainder of said management information is read out by said readout means, said control means being configured to direct said readout means to read said remainder from the location where said remainder is recorded, which has been notified from said signal processing means.

When the portion of the management information includes information indicating whether the remainder of the management information is present or not in the second area, the presence or absence of the remainder of the management information may be determined based on this information by using the signal processing means. With this, it becomes possible to play encrypted content similarly to conventional ones even when the remainder of the management information is not present in the second area.

Said signal processing means is, for example, configured to acquire a first decryption key for the decryption of said remainder of said management information, from said portion of said management information, and acquire a second decryption key for the decryption of said encrypted content, from said remainder of said management information. With this, the encrypted content is played.

A content player method of the present invention is a method with which content can be played from a recording medium in which a portion of management information including information for the decryption of encrypted content that has been encrypted through a predetermined technique is recorded in a first area of a relatively high security level, and the remainder of said management information that has been encrypted through said predetermined technique and said encrypted content are recorded in a second area of a relatively low security level, said portion of said management information including information indicating the presence or absence of said remainder of said management information, information indicating the location at which said remainder is recorded and information for the decryption of said remainder, the method being to be carried out by a device comprising readout means for reading said encrypted content and said management information out of said recording medium, signal processing means for the decryption of said encrypted content with said management information that has been read out by said readout means, and control means adapted to determine the location from which said readout means reads said encrypted content and said management information out of said recording medium and to direct said readout means to read out from said location. This content player method executes a step in which said readout means reads out said portion of said management information recorded in said first area and supplies it to said signal processing means at the beginning of processing; and a step in which said signal processing means acquires a first decryption key for the decryption of said encrypted content or said remainder of said management information from said portion of said management information that has been read out by said readout means, determines the presence or absence of said remainder of said management information with said information indicating the presence or absence of said remainder of said management information, detects the location where said remainder of said management information is recorded when said remainder of said management information is present to notify said control means of it, or decrypts said encrypted content that is continuously read out by said readout means using said first decryption key when said remainder of said management information is absent. When said remainder of said management information is present, then executed are: a step in which said control means directs said readout means to read out said remainder from the location where said remainder of said management information is recorded, which has been notified from said signal processing means; a step in which said readout means supplies said remainder of said management information that has been read to said signal processing means; a step in which said signal processing means decrypts said remainder of said management information using said first decryption key to acquire a second decryption key for the decryption of said encrypted content from said remainder that has been decrypted; a step in which said control means directs said readout means to read out said encrypted content; and a step in which said signal processing means decrypts said encrypted content that has been read out by said readout means using said second decryption key.

A computer program of the present invention is a computer program for providing, on a computer comprising readout means for reading a portion of management information, a remainder of said management information, and encrypted content in this order, out of a recording medium in which said portion of said management information including information for the decryption of encrypted content that has been encrypted through a predetermined technique is recorded in a first area of a relatively high security level, and said remainder of said management information that has been encrypted through said predetermined technique and said encrypted content are recorded in a second area of a relatively low security level, said portion of said management information including information indicating the location at which said remainder of said management information is recorded and information for the decryption of said remainder, signal processing means adapted to decrypt said encrypted content according to said management information that has been read out by said readout means; and control means adapted to determine the location from which said readout means reads said management information or said encrypted content out of said recording medium and to direct said readout means to read out from said location. This computer program is for allowing: said signal processing means to detect the location where said remainder of said management information is recorded from said portion of said management information and notify said control means of it, and to decrypt said remainder of said management information with said portion of said management information when said remainder of said management information is read out by said readout means, and said control means to direct said readout means to read said remainder from the location where said remainder is recorded, which has been notified from said signal processing means.

Another computer program of the present invention is a computer program that provides, on a computer capable of playing content from a recording medium in which a portion of management information including information for the decryption of encrypted content that has been encrypted through a predetermined technique is recorded in a first area of a relatively high security level, and the remainder of said management information that has been encrypted through said predetermined technique and said encrypted content are recorded in a second area of a relatively low security level, said portion of said management information including information indicating the presence or absence of said remainder of said management information, information indicating the location at which said remainder of said management information is recorded and information for the decryption of said remainder, readout means for reading said encrypted content and said management information out of said recording medium, signal processing means for the decryption of said encrypted content with said management information that has been read out by said readout means, and control means adapted to determine the location from which said readout means reads said encrypted content and said management information out of said recording medium and to direct said readout means to read out from said location. This computer program executes a processing in which said readout means reads out said portion of said management information recorded in said first area and supplies it to said signal processing means at the beginning of processing; and a processing in which said signal processing means acquires a first decryption key for the decryption of said encrypted content or said remainder of said management information from said portion of said management information that has been read out by said readout means, determines the presence or absence of said remainder of said management information with said information indicating the presence or absence of said remainder of said management information, detects the location where said remainder of said management information is recorded when said remainder of said management information is present to notify said control means of it, or decrypts said encrypted content that is continuously read out by said readout means using said first decryption key when said remainder of said management information is absent, and when said remainder of said management information is present, said computer program directing said computer to further execute: a processing in which said control means directs said readout means to read out said remainder from the location where said remainder of said management information is recorded, which has been notified from said signal processing means; a processing in which said readout means supplies said remainder of said management information that has been read to said signal processing means; a processing in which said signal processing means decrypts said remainder of said management information using said first decryption key to acquire a second decryption key for the decryption of said encrypted content from said remainder that has been decrypted; a processing in which said control means directs said readout means to read out said encrypted content; and a processing in which said signal processing means decrypts said encrypted content that has been read out by said readout means using said second decryption key.

BRIEF DESCRIPTION OF THE DRAWINGS

FIGS. 3A and 3B are illustrative views of a format of a decryption information C;

FIG. 4 is a view showing an example in which multiple pieces of encrypted decryption information are recorded in an area D;

BEST MODE FOR CARRYING OUT THE INVENTION

An embodiment of the present invention is described in detail below.

Figures 1, 2:
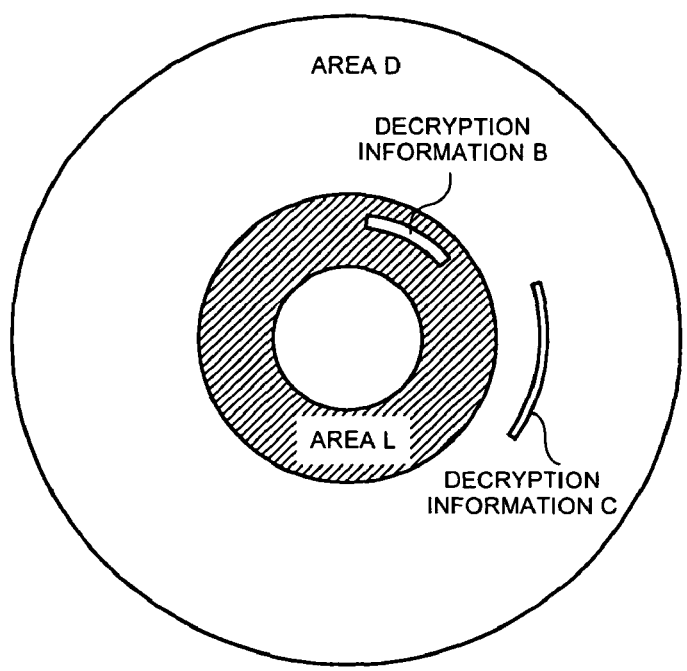
FIG. 1 is an illustrative view of a recording area of a recording medium of this embodiment.
FIG. 2 is an illustrative view of a format of decryption information B.

FIG. 1 is an illustrative view of a recording area for encrypted content and another recording area for decryption information which are provided on a recording medium of this embodiment. This recording medium has an area L around the clamping area and has an area D around the area L. The area L has a storage capacity that is significantly smaller than the storage capacity of the area D. For DVD Audio as an example, an area available for the recording of decryption information has a capacity of 3 megabytes, according to Document 1.

The area L is an area where management information such as decryption information is recorded. It corresponds to an area called a "lead-in area" for DVD-ROMs, for example. Thus, the area L is much more secure relative to the area D. The information recorded on this area cannot be accessed for modification from ordinary user programs.

The area D is an area that is less secure relative to the area L. The information recorded in the area D can be read out easily. This is why the digital content recorded in the area D is encrypted content that has been encrypted, so that mere reading of it provides nothing.

In the recording medium of this embodiment, the decryption information is also recorded in the area D which is intended for recording the encrypted content, when the data size of the decryption information is larger than the storage capacity of the area L. The area D is less secure than the area L, so that the decryption information to be recorded in the area D is encrypted in a manner similar to that for the encrypted content. The decryption information that is recorded in the area D is kept secure because of being encrypted.

In this specification, all pieces of decryption information that should be recorded on the recording medium are indicated as decryption information A, the decryption information to be recorded in the area L is indicated as decryption information B (a part of the decryption information), and the encrypted decryption information that is to be recorded in the area D is indicated as decryption information C (the remainder of the decryption information). When the area D contains multiple pieces of encrypted decryption information, they are indicated as decryption information C1, C2, . . . The combination of all of the decryption information B and the decryption information C (C1, C2, . . . ) represents the decryption information A. The data size of the decryption information A is larger than the storage capacity of the area L while the data size of the decryption information B is smaller than the storage capacity of the area L.

The decryption information B that is recorded in the area L may be, for example, provided by the format as shown in an illustrative view in FIG. 2. The decryption information B shown in FIG. 2 includes information for the decryption of the encrypted decryption information C. A decryption key for the decryption of the encrypted content can be obtained with the decryption information C that has been decrypted with the decryption information B.

The decryption information B in FIG. 2 is made up of a flag indicating the presence or absence of the decryption information C within the area D, the start address for the decryption information C that is recorded in the area D, information indicating the data size of the decryption information C, and decryption information A0 for the decryption of the decryption information C. This format specifies the start address and the data size of the decryption information C.

This format can be used for recording media having no decryption information C because the flag serves to show the presence or absence of the decryption information C within the area D. When the decryption information C is added, the start address and the data size of the decryption information C can be added by means of changing the flag. The region of the area D at which the decryption information C is recorded can be defined exactly according to the start address and the data size of the decryption information C.

The decryption information C that is recorded in the area D is, for example, provided by the format as shown in illustrative views in FIG. 3A or 3B after being decrypted.

The decryption information C includes, for example, at least one of information about a player that is allowed to decrypt and play the encrypted content and information about a player that is not allowed to do so, and information for the decryption of the encrypted content (e.g., information that is used for obtaining a decryption key).

FIG. 3A shows a format of the simplest decryption information C after decryption. The decryption information C includes only the decryption informational, which is, for example, at least one of the information about the player that is allowed to decrypt and play the encrypted content and the information about the player that is not allowed to do so, and the information for the decryption of the encrypted content. The decryption information C which has the aforementioned format after decryption, is recorded starting from the start address specified by the decryption information B.

FIG. 3B shows a format that is used when multiple pieces of decryption information C1, C2 that have been encrypted are recorded in the area D. The decryption information A maybe added and updated as described above. In such a case, this format can be used only by means of changing the flag indicating the presence or absence of the decryption information C2 to be added, and adding the information indicating the start address of the decryption information C2 to be added and the data size thereof, to the original decryption information C1.

In addition, with this format, the decryption information C may be divided into decryption information C1, C2, . . . to record them. This means that all the decryption information C is not read at a time even in the area D that is less secure, which results in improvement of the security level.

The decryption information C1 in FIG. 3B is made up of a flag indicating the presence or absence of the decryption information C2 that has been added or divided, information indicating the start address of the decryption information C2 and the data size thereof, and the aforementioned decryption information A1. This format specifies the presence or absence of the additional decryption information C2, the start address of the additional decryption information C2, and the data size thereof. The region within the area D where the decryption information C2 has been recorded can be determined based on the start address of the additional decryption information C2 and the data size thereof. The format of the decryption information C2 used is either the one in FIG. 3A or the one in FIG. 3B. When decryption information C3 is present in the area D, then the format is the one in FIG. 3B.

FIG. 4 is a view showing an example where multiple pieces of encrypted decryption information C1, C2 are written in the area D. In the figure, the arcuate portion in the area L is the decryption information B and the arcuate portions in the area D are the decryption information C1 and C2.

It should be noted that, when the encrypted decryption information is recorded at multiple locations in the area D as shown in FIG. 4, the decryption information C1 in the area D may have a format as shown in FIG. 3A and that information indicating the start addresses of the pieces of decryption information in the area D and the data sizes thereof may be added to the decryption information B in the area L. In the case in FIG. 4, such a format is used that includes, ahead of the decryption information A0, a flag indicating the presence or absence of the decryption information C1, C2, the information indicating the start address of the decryption information C1 and the data size thereof, and the information indicating the start address of the decryption information C2 and the data size thereof.

With such a recording medium, an entire piece of decryption information can be recorded without affecting the play of content even when the data size of the decryption information A becomes larger than the storage capacity of the area L. For example, even when the number of the players that should be revoked for their play is expected to increase, the addition may be added to the area D rather than the area L. Thus, it becomes unnecessary to hold a blank area within the area L for future addition of the decryption information. The storage capacity of the recording medium can thus be used effectively.

[Content Player]

Figure 5:
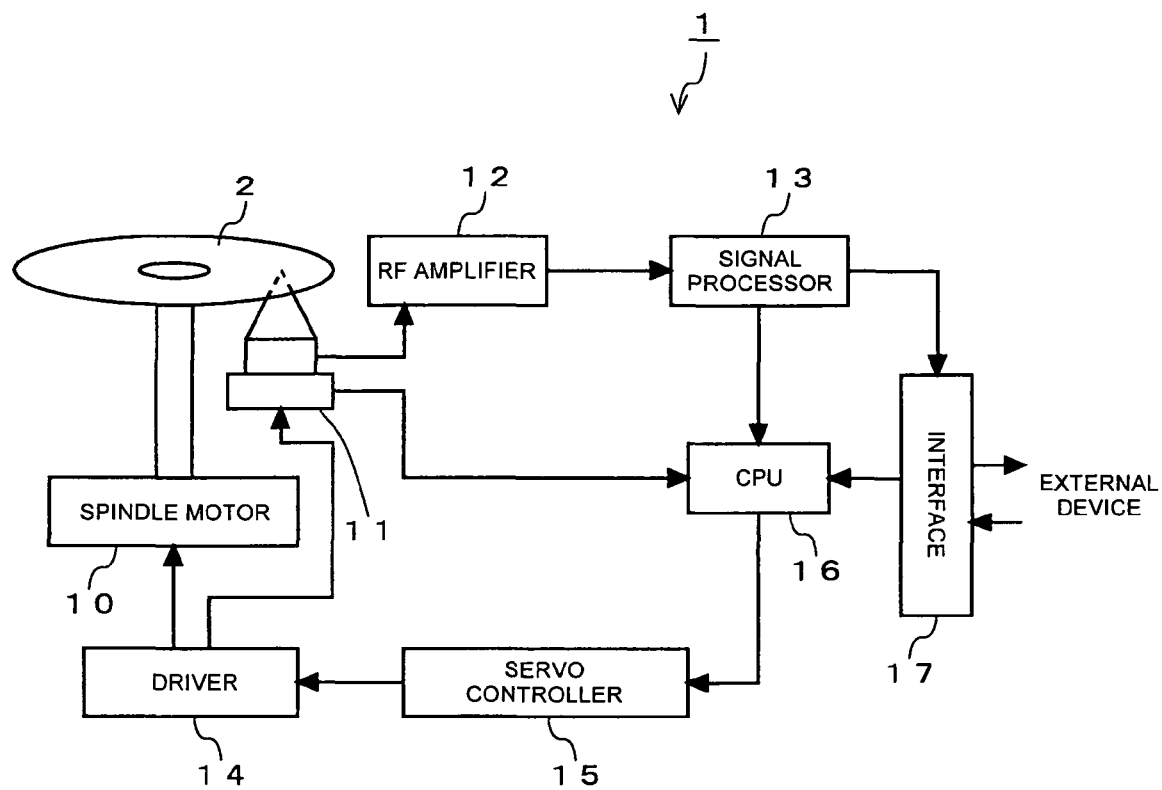
FIG. 5 is a hardware configuration diagram of a content player of this embodiment.

FIG. 5 is a hardware configuration diagram showing an embodiment of a content player of the present invention. The content player 1 may be used in, for example, CD players, DVD players, CD and DVD drives of a personal computer, or entertainment devices on which a video game can be run. It is adapted to decrypt the encrypted content from a recording medium 2 as described above and supply it to an external device to play content. The external device may be, for example, speakers and displays, as well as other information processors such as entertainment devices on which a video game can be run and personal computers.

The recording medium 2 that is played with the content player 1 is, for example, a round optical disk such as a CD or a DVD. In this recording medium 2, the decryption information B is recorded in a lead-in area which is an example of the area L, and the encrypted decryption information C is recorded in the area D for the recording of encrypted content.

The content player 1 comprises a spindle motor 10 for rotating the recording medium 2, a pickup 11 that moves radially across the recording medium 2 to read the information recorded on the recording medium 2, an RF amplifier 12 that is adapted to receive the information read by the pickup 11 as an RF signal, a signal processor 13 that is adapted to receive the information read out of the recording medium 2 through the RF amplifier 12 and decrypt it, a driver 14 and a servo controller 15 for the rotation control of the spindle motor 10 and the position control of the pickup 11, a CPU (Central Processing Unit) 16 that controls the operation of the entire content player 1, and an interface 17 for exchanging information between the content player 1 and other equipment.

The spindle motor 10 and the pickup 11 correspond to the readout means of the present invention. The signal processor 13 corresponds to the signal processing means of the present invention. The CPU 16, the servo controller 15, and the driver 14 correspond to the control means of the present invention.

The signal processor 13, the CPU 16, the servo controller 15, and the driver 14 may be provided as hardware components. Alternatively, the functions of these components may be achieved by means of the CPU 16 executing a computer program of the present invention.

The signal processor 13 is for performing processing to obtain a decryption key according to the decryption information received from the recording medium 2 through the RF amplifier 12, and for decrypting the encrypted content by using the decryption key that has been obtained. The signal processor 13 receives the decryption information B recorded in the area L and determines whether the flag thereof indicates the presence of the decryption information C within the area D. If the presence of the decryption information C is indicated, then it checks the start address of the decryption information C and the data size thereof and notifies the CPU 16 of it. When the decryption information C indicates that the area D contains other decryption information, the CPU 16 is notified of the start address of that decryption information and the data size thereof.

The result of the decryption of the encrypted content is supplied from the signal processor 13 to the external device through the interface 17. The external device plays music, video or executes a game in response to the output from the interface 17.

The CPU 16 controls the operation of the entire content player 1. In the present invention in particular, the spindle motor 10 and the pickup 11 can be operated in response to the notification from the signal processor 13. In response to the notification about the start address of the decryption information C recorded on the area D and the data size thereof, the CPU 16 controls the spindle motor 10 and the pickup 11 through the driver 14 and the servo controller 15 according to this notification to direct the pickup 11 to read the decryption information C from the start address of the decryption information C on the recording medium 2.

Figure 6:
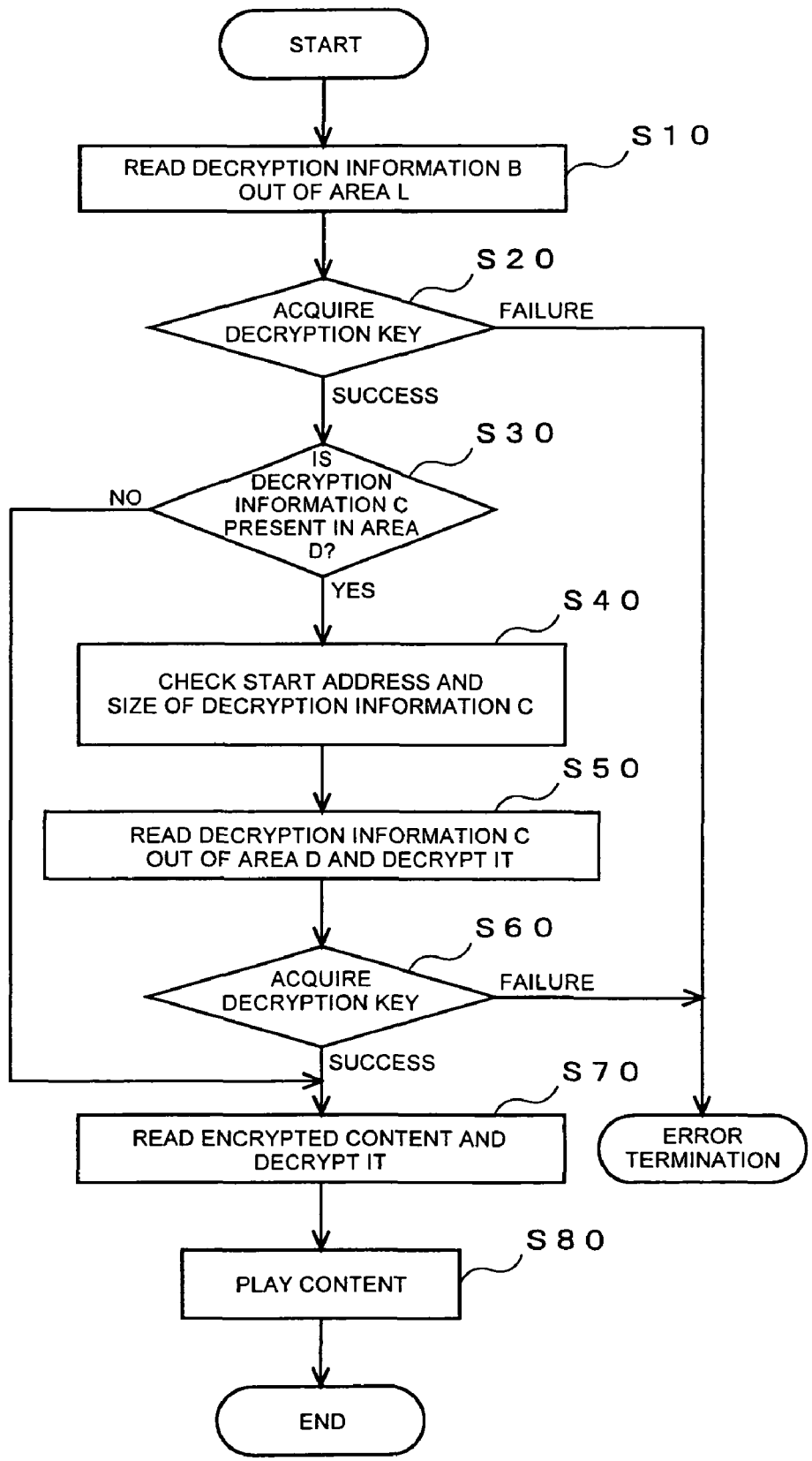
FIG. 6 is a process flow diagram illustrating a procedure to play content using a content player of this embodiment.

FIG. 6 is a process flow diagram illustrating a procedure to play encrypted content using the aforementioned content player 1, from the recording medium 2 in which the decryption information B is recorded in the area L and the decryption information C and the encrypted content are recorded in the area D.

When the content player 1 is activated through, for example, application of power, the spindle motor 10 and the pickup 11 are cooperatively operated to read management information including, for example, TOC and the decryption information B, out of the area L of the recording medium 2 (step S10). The read management information is supplied to the signal processor 13 through the RF amplifier 12. The signal processor 13 performs predetermined processing on the incoming management information. In this embodiment, only the processing on the decryption information is described.

The signal processor 13 performs processing to acquire a decryption key to be used for the decryption of the encrypted content and/or the decryption information C that are/is recorded in the area D, using the decryption information A0 that is included in the decryption information B (step S20). The decryption key acquired here is used for the decryption of the encrypted content when there is no decryption information C in the area D. It is used for the decryption of the decryption information C when the area D contains the decryption information C. If the acquisition of the decryption key is failed (step S20: failure), an error is issued and the processing is terminated.

If the acquisition of the decryption key goes well (step S20: success), then the signal processor 13 uses the flag of the decryption information B that is recorded in the area L to determine whether or not the decryption information C is present in the area D for the recording of the encrypted content (step S30). If the flag indicates that the decryption information C is present (step S30: yes), then the signal processor 13 detects the start address of the decryption information C and the data size thereof, from the decryption information B. The detected start address of the decryption information C and the data size thereof are notified by the signal processor 13 to the CPU 16.

The CPU 16 determines which region of the area D of the recording medium 2 contains the decryption information C, according to the start address of the decryption information C and the data size thereof received from the signal processor 13 (step S40).

The CPU 16 controls the spindle motor 10 and the pickup 11 through the driver 14 and the servo controller 15 to direct the pickup 11 to read the decryption information C from the location where the decryption information C is recorded on the recording medium 2. The decryption information C is recorded in the area D of the recording medium 2, so that the pickup 11 reads the decryption information C out of the area D. The decryption information C is supplied to the signal processor 13 through the RF amplifier 12 when read out by the pickup 11. The signal processor 13 decrypts the decryption information C by using the decryption key acquired by the decryption information B to obtain the decryption information A1 that is necessary for the decryption of the encrypted content (step S50).

The signal processor 13 performs processing to acquire the decryption key that is used for the decryption of the encrypted content by the decryption information A1 (step S60). If the acquisition of the decryption key is failed (step S60: failure), then an error is issued and the processing is terminated.

When the acquisition of the decryption key goes well (step S60: success), then the signal processor 13 requests the CPU 16 to acquire the encrypted content. When the acquisition of the encrypted content is requested by the signal processor 13, the CPU 16 controls the spindle motor 10 and the pickup 11 through the driver 14 and the servo controller 15 to direct the pickup 11 to read the encrypted content out of the area D of the recording medium 2.

The encrypted content read out of the area D is supplied from the pickup 11 to the signal processor 13 through the RF amplifier 12. The signal processor 13 decrypts the encrypted content by using the decryption key acquired at the step S60 (step S70). The encrypted content after decryption is supplied from the signal processor 13 to the external device through the interface 17 and played (step S80).

When the area D contains no decryption information C at the step S30 (step S30: no), the signal processor 13 requests the CPU 16 to acquire the encrypted content. Then, the content player 1 performs the processing after the step S70.

When the decryption information C within the area D indicates that the area D contains other encrypted decryption information, in other words, multiple pieces of decryption information C1, C2 are recorded in the area D as is shown in FIG. 4, then the step S40 through the step S60 are repeated to read and decrypt the whole piece of encrypted decryption information recorded in the area D.

In such a case, after the step S60, it is determined whether or not any other decryption information is present in the area D. If there is, then the processing from the step S40 is repeated again. If not, the processing after the step S70 is performed.

The invention claimed is:

1. A non-transitory recording medium having stored thereon instructions for providing:
   on a content player comprising readout means for reading a portion of decryption information for decryption of encrypted content, a remainder of said decryption information, and encrypted content in this said management order, out of a non-transitory medium having two areas of different security levels in which the encrypted content that has been encrypted through a predetermined technique and the decryption information for the decryption of the encrypted content are recorded, said encrypted content is decrypted and played by using the decryption information through the content player characterized in that:
   a portion of said decryption information is recorded in a first area having a predetermined security level;
   the remainder of said decryption information that has been encrypted through said predetermined technique and said encrypted content are recorded in a second area having a lower security level than the security level of the first area; and
   said portion of said decryption information recorded in said first area includes information indicating the presence or absence of said remainder of said decryption information, information indicating the location at which said remainder is recorded, information indicating the data size of said remainder, and information for the decryption of said remainder,
   said remainder of said decryption information is read out from the location according to the information indicating the location at which the remainder included in the portion of the decryption information is recorded, after the portion of the decryption information has been read out; wherein
   signal processing means included in the content player is adapted to decrypt said encrypted content according to said decryption information that has been read out by said readout means; and
   control means comprised within the content player is adapted to determine the location from which said readout means reads said decryption information or said encrypted content out of said medium and to direct said readout means to read out from said location,
   said instructions allow:
   said signal processing means to detect the location where said remainder of said decryption information is recorded from said portion of decryption information and notify said control means of it, and to decrypt said remainder of said decryption information with said portion of said decryption information when said remainder of said decryption information is read out by said readout means, and
   said control means to direct said readout means to read said remainder from the location where said remainder is recorded, which has been notified from said signal processing means.

2. The recording medium as claimed in claim 1, wherein said decryption information is larger in data size than the storage capacity of said first area, and said portion of said decryption information is smaller in data size than the storage capacity of said first area.

3. The recording medium as claimed in claim 1, wherein said remainder of said decryption information is divided into blocks and is separately recorded at multiple locations in said second area, said portion of said decryption information including information indicating one or more of the multiple locations at which the blocks of said remainder are recorded, each divided block of said remainder of said decryption information including information indicating the locations at which other divided block(s) of the remainder are recorded, all locations at which the divided blocks of said remainder of said decryption information are recorded being able to be identified by using said portion of said decryption information and the divided blocks of said remainder of said decryption information.

4. The recording medium of claim 3, wherein the remainder of said decryption information has a size which can be varied via manipulation of a flag indicating the presence or absence of the remainder of said decryption information.

5. The recording medium as claimed in claim 1, wherein said remainder of said decryption information is divided into blocks and is separately recorded at multiple locations in said second area, said portion of said decryption information including information indicating all locations at which the blocks of said remainder are recorded.

6. The recording medium as claimed in claim 1, wherein said portion of said decryption information includes information about a player that is allowed to decrypt and play said encrypted content and information about a player that is not allowed to do so.

7. The recording medium of claim 1, wherein the location information comprised within the first area specifies a location selected from a plurality of locations in the second area wherein the said remainder is recorded.

8. A content player for playing content from a non-transitory recording medium comprising:

readout means for reading, out of said recording medium, in respective order a portion of management information, remainder of said management information, and encrypted content wherein the portion of management information including information for decryption of encrypted content that has been encrypted through a predetermined technique is recorded in a first area of the recording medium of a predetermined security level, and the remainder of said management information that has been encrypted through said predetermined technique and said encrypted content are recorded in a second area of the recording medium of a lower security level than the security level of the first area, said portion of said management information including information indicating the location at which said remainder of said management information is recorded and information for decryption of said remainder;

signal processing means adapted to decrypt said encrypted content according to said management information read by said readout means; and control means adapted to determine the location from which said readout means reads said management information or said encrypted content out of said recording medium and to direct said readout means to read out from said location;

said signal processing means being configured to detect the location where said remainder of said management information is recorded from said portion of said management information and notify said control means of it, and to decrypt said remainder of said management information with said portion of said management information when said remainder of said management information is read out by said readout means, said control means being configured to direct said readout means to read said remainder from the location where said remainder is recorded, which has been notified from said signal processing means.

9. The content player as claimed in claim 8, wherein said portion of said management information includes information indicating the presence or absence of said remainder of said management information, said signal processing means being configured to determine the presence or absence of said remainder of said management information based on this information.

10. The content player as claimed in claim 8, wherein said signal processing means is configured to acquire a first decryption key for the decryption of said remainder of said management information, from said portion of said management information, and acquire a second decryption key for the decryption of said encrypted content, from said remainder of said management information.

11. A content player method which facilitates playing content from a non-transitory recording medium, the method comprising the following steps:

a step in which a portion of management information including information for the decryption of encrypted content that has been encrypted through a predetermined technique is recorded in a first area of the non-transitory recording medium having a predetermined security level, and the remainder of said management information that has been encrypted through said predetermined technique and said encrypted content are recorded in a second area of the recording medium of a lower security level than the predetermined security level, said portion of said management information including information indicating the presence or absence of said remainder of said management information, information indicating the location at which said remainder is recorded and information for the decryption of said remainder;

a step in which readout means for reading said encrypted content and said management information out of said recording medium reads out said portion of said management information recorded in said first area and supplies it to a signal processing means at the beginning of processing, wherein the signal processing means is adapted to decrypt said encrypted content with said management information that has been read out by said readout means;

a step in which said signal processing means acquires a first decryption key for the decryption of said encrypted content or said remainder of said management information from said portion of said management information that has been read out by said readout means, determines the presence or absence of said remainder of said management information with said information indicating the presence or absence of said remainder of said management information, detects the location where said remainder of said management information is recorded when said remainder of said management information is present to notify a control means of it, wherein the control means is adapted to determine the location from which said readout means reads said encrypted content and said management information out of said recording medium and to direct said readout means to read out from said location, such that the signal processing means decrypts said encrypted content that is continuously read out by said readout means using said first decryption key when said remainder of said management information is absent, when said remainder of said management information is present, then said method further executing:

a step in which said control means directs said readout means to read out said remainder from the location where said remainder of said management information is recorded, which has been notified from said signal processing means;

a step in which said readout means supplies said remainder of said management information that has been read to said signal processing means;

a step in which said signal processing means decrypts said remainder of said management information using said first decryption key to acquire a second decryption key for the decryption of said encrypted content from said remainder that has been decrypted;

a step in which said control means directs said readout means to read out said encrypted content; and a step in which said signal processing means decrypts said encrypted content that has been read out by said readout means using said second decryption key.

12. A non-transitory computer-readable recording medium, on which a computer program is recorded, said computer program for providing:

decryption of encrypted content on a computer comprising:

readout means for reading a portion of management information, a remainder of the management information, and encrypted content in this said management order, out of a non-transitory medium in which said portion of said management information including information for the decryption of the encrypted content that has been encrypted through a predetermined technique is recorded in a first area of a predetermined security level, and said remainder of said management information that has been encrypted through said predetermined technique and said encrypted content are recorded in a second area of a security level lower than the predetermined security level, said portion of said management information including information indicating the location at which said remainder of said management information is recorded and information for the decryption of said remainder, signal processing means adapted to decrypt said encrypted content according to said management information that has been read out by said readout means; and control means adapted to determine the location from which said readout means reads said management information or said encrypted content out of said medium and to direct said readout means to read out from said location, said computer program is for allowing:

said signal processing means to detect the location where said remainder of said management information is recorded from said portion of said management information and notify said control means of it, and to decrypt said remainder of said management information with said portion of said management information when said remainder of said management information is read out by said readout means, and said control means to direct said readout means to read said remainder from the location where said remainder is recorded, which has been notified from said signal processing means.

13. A non-transitory computer-readable recording medium, on which a computer program is recorded, said computer program adapted to execute:

a processing on a computer for playing content from a non-transitory medium in which a portion of management information including information for decryption of encrypted content that has been encrypted through a predetermined technique is recorded in a first area of a predetermined security level, and remainder of said management information that has been encrypted through said predetermined technique and said encrypted content are recorded in a second area of a security level lower than the predetermined security level, said portion of said management information including information indicating the presence or absence of said remainder of said management information, information indicating the location at which said remainder is recorded and information for the decryption of said remainder, wherein the computer comprises readout means for reading said encrypted content and said management information out of said recording medium, signal processing means for the decryption of said encrypted content with said management information that has been read out by said readout means, and control means adapted to determine the location from which said readout means reads said encrypted content and said management information out of said recording medium and to direct said readout means to read out from said location;

a processing in which said readout means reads out said portion of said management information recorded in said first area and supplies it to said signal processing means at the beginning of processing; and a processing in which said signal processing means acquires a first decryption key for the decryption of said encrypted content or the remainder of said management information from a portion of said management information that has been read out by said readout means, determines the presence or absence of said remainder of said management information with said information indicating the presence or absence of said remainder of said management information, detects the location within the second area where said remainder of said management information is recorded when said remainder of said management information is present to notify said control means of it, or decrypts said encrypted content that is continuously read out by said readout means using said first decryption key when said remainder of said management information is absent, and when said remainder of said management information is present, said computer program directing said computer to further execute:

a processing in which said control means directs said readout means to read out said remainder from the location where said remainder of said management information is recorded, which has been notified from said signal processing means;

a processing in which said readout means supplies said remainder of said management information that has been read to said signal processing means;

a processing in which said signal processing means decrypts said remainder of said management information using said first decryption key to acquire a second decryption key for the decryption of said encrypted content from said remainder that has been decrypted;

a processing in which said control means directs said readout means to read out said encrypted content; and a processing in which said signal processing means decrypts said encrypted content that has been read out by said readout means using said second decryption key.

* * * * *